US012759118B2

(12) United States Patent
Okelberry et al.

(10) Patent No.: US 12,759,118 B2
(45) Date of Patent: Oct. 13, 2026

(54) FASTENER MAGAZINE

(71) Applicant: Builders FirstSource, Inc., Irving, TX (US)

(72) Inventors: Kristopher Ryan Okelberry, Nampa, ID (US); Jacob Hansen, Nampa, ID (US); Anthony Wayne Foster, Middleton, ID (US); Cole Jay Logemann, Nampa, ID (US)

(73) Assignee: Builders FirstSource, Inc., Irving, TX (US)

( * ) Notice: Subject to any disclaimer, the term of this patent is extended or adjusted under 35 U.S.C. 154(b) by 333 days.

(21) Appl. No.: 18/494,576

(22) Filed: Oct. 25, 2023

(65) Prior Publication Data

US 2024/0139918 A1 May 2, 2024

Related U.S. Application Data

(60) Provisional application No. 63/381,535, filed on Oct. 28, 2022.

(51) Int. Cl.
*B25B 23/06* (2006.01)
*B25J 11/00* (2006.01)

(52) U.S. Cl.
CPC ............. *B25B 23/06* (2013.01); *B25J 11/005* (2013.01)

(58) Field of Classification Search
CPC . B25B 21/002; B25B 21/007; B25B 23/0085; B25B 23/02; B25B 23/04; B25B 23/045; B25B 23/005; B25B 23/06; B25B 23/065; B25B 23/08; B25B 23/10; B25B 23/147; B23P 19/001; B23P 19/004; B23P 19/006; B23P 19/008; B23P 19/02; B23P 19/04; B23P 19/06; B25C 1/001; B25C 1/005; B25C 3/002
See application file for complete search history.

(56) References Cited

U.S. PATENT DOCUMENTS 2,079,005 A * 5/1937 Freydberg ................. A47F 1/04 221/70
5,890,405 A * 4/1999 Becker .................. B25B 23/147 81/434
7,234,623 B2 6/2007 Li
9,616,557 B2 4/2017 Hays et al.

OTHER PUBLICATIONS

Simpson, "Fastening Systems", strongtie.com, Jul. 1, 2019, Simpson Strong Tie Company Inc.

* cited by examiner

*Primary Examiner* — Robert J Scruggs
(74) *Attorney, Agent, or Firm* — Alston & Bird LLP

(57) ABSTRACT

A fastener strip magazine may include a plate and a post attached to and perpendicular to the plate, wherein the post is configured to rotatably support a spool configured to support a fastener strip. The spool may include a strap configured to wind about the spool and a clip attached to the strap and configured to attach to a first end of the fastener strip. The magazine may further include a guide bar attached to the plate and configured to direct a second end of the fastener strip to a feeder as the fastener strip uncoils.

13 Claims, 11 Drawing Sheets

FASTENER MAGAZINE

CROSS-REFERENCE TO RELATED APPLICATIONS

This application is a continuation of U.S. Provisional Application No. 63/381,535 filed Oct. 28, 2022, which application is herein incorporated by reference in its entirety.

TECHNICAL FIELD

The present disclosure relates generally to the field of fastener systems. More particularly, the disclosure is directed to fastener magazines of automated fastener systems.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

A fastener system as described herein may be a fastener system for inserting fasteners to attach or fasten materials together or otherwise secure one object to another object. The fastener system may be a robot fastener system or an automated fastener system. For example, the fastener system may include several screw guns that automatically insert screws to bind materials together. Each screw gun may be fed by a magazine that feeds a strip of screws to the screw gun.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

References to approximations are made throughout this specification, such as by use of the term "substantially." For each such reference, it is to be understood that, in some embodiments, the value, feature, or characteristic may exist without approximation. For example, where qualifiers such as "about" and "substantially" are used, these terms include within their scope the qualified words in the absence of their qualifiers. For example, where the term "substantially perpendicular" is recited with respect to a feature, it is understood that in some embodiments the feature may have a precisely perpendicular configuration.

The phrase "coupled to" is broad enough to refer to any suitable coupling or other form of interaction between two or more entities, including mechanical interaction. Thus, two components may be coupled to each other even though they are not in direct contact with each other.

Figure 1:
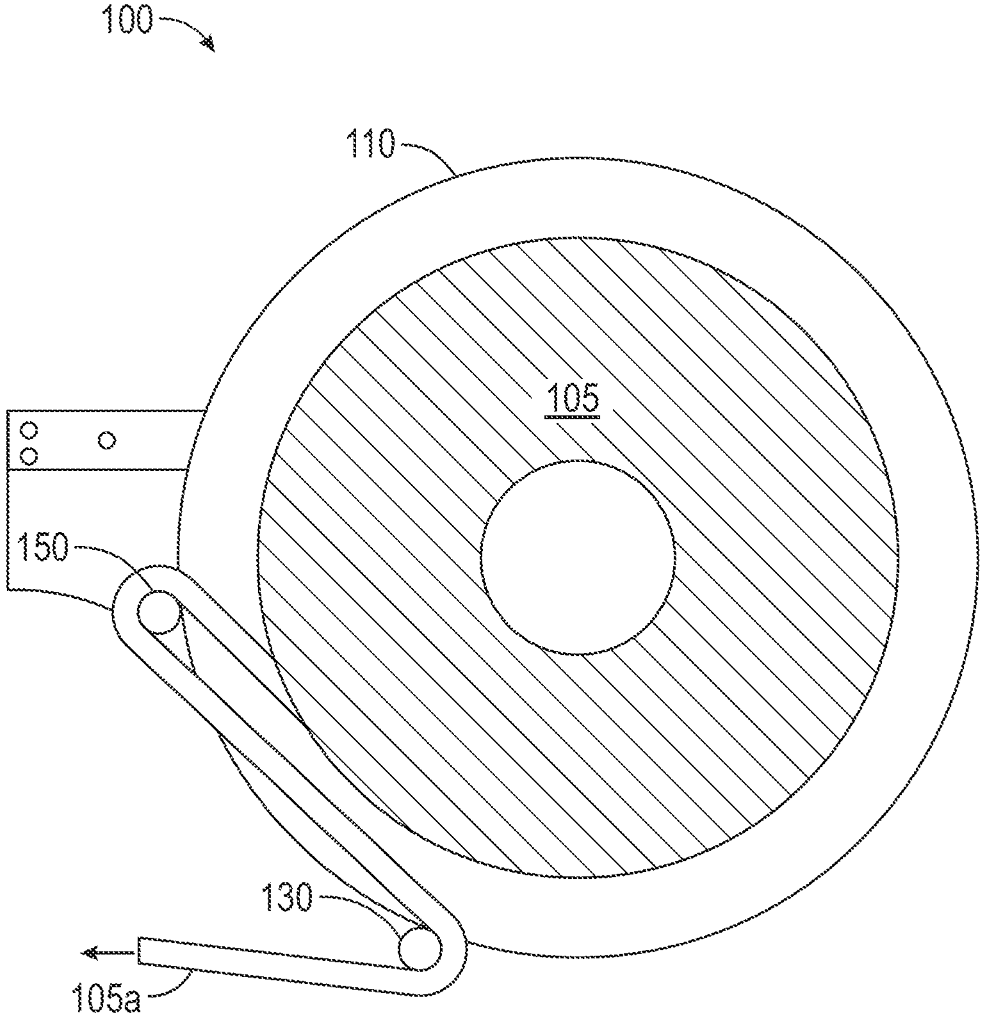
FIG. 1 is a side view of a fastener system magazine, according to one embodiment of the present disclosure.

FIG. 1 is a side view of an example fastener system magazine 100. The magazine 100 can be configured for use with a fastener system that can insert fasteners to secure two objects together or otherwise attach one object to another object. The magazine 100 may include a plate 110. The plate 110 may be a rigid plate configured to receive a fastener strip 105. The plate may be composed of plastic, metal, wood, or another rigid material. The plate 110 may be substantially round or another shape. In some embodiments, the plate 110 may include protrusions, voids, or other elements for coupling the plate to a frame of a fastener system or a mounting plate of the fastener system. Dimensions of the plate 110 may be based on dimensions of the fastener strip 105. In some embodiments, the plate 110 is slightly larger than the fastener strip 105 before the fastener strip 105 is uncoiled. In other embodiments, the plate 110 is the same size as the fastener strip 105 before the fastener strip 105 is uncoiled.

The magazine 100 may include a first guide, such as a guide bar 130 and a second guide, such as guide bar 150. The first guide bar 130 and the second guide bar 150 may be configured to direct a first end 105*a* of the fastener strip 105 toward a feeder of the fastener system. The first guide bar 130 and the second guide bar 150 may be configured to maintain tension in the fastener strip 105 as the fastener strip 105 uncoils. In some embodiments, the first guide bar 130 and the second guide bar 105 may be textured so as to provide resistance to movement of the fastener strip 105 as the fastener strip 105 uncoils. In other embodiments, the first guide bar 130 and the second guide bar 105 may be positioned so as to maintain tension in the fastener strip 105 as the fastener strip 105 uncoils. For example, the first guide bar 130 and the second guide bar 150 may be positioned such that the first end 105*a* of the fastener strip 105 exits the fastener strip 105 in a first direction and is directed from the second guide bar 150 to the first guide bar 130 in a second direction substantially opposite the first direction as the fastener strip 105 uncoils. Friction between the fastener strip 105 and the first guide bar 130 and the second guide bar 150 can resist motion of the fastener strip 105 as the fastener strip uncoils, maintaining tension in the fastener strip 105.

Figure 2:
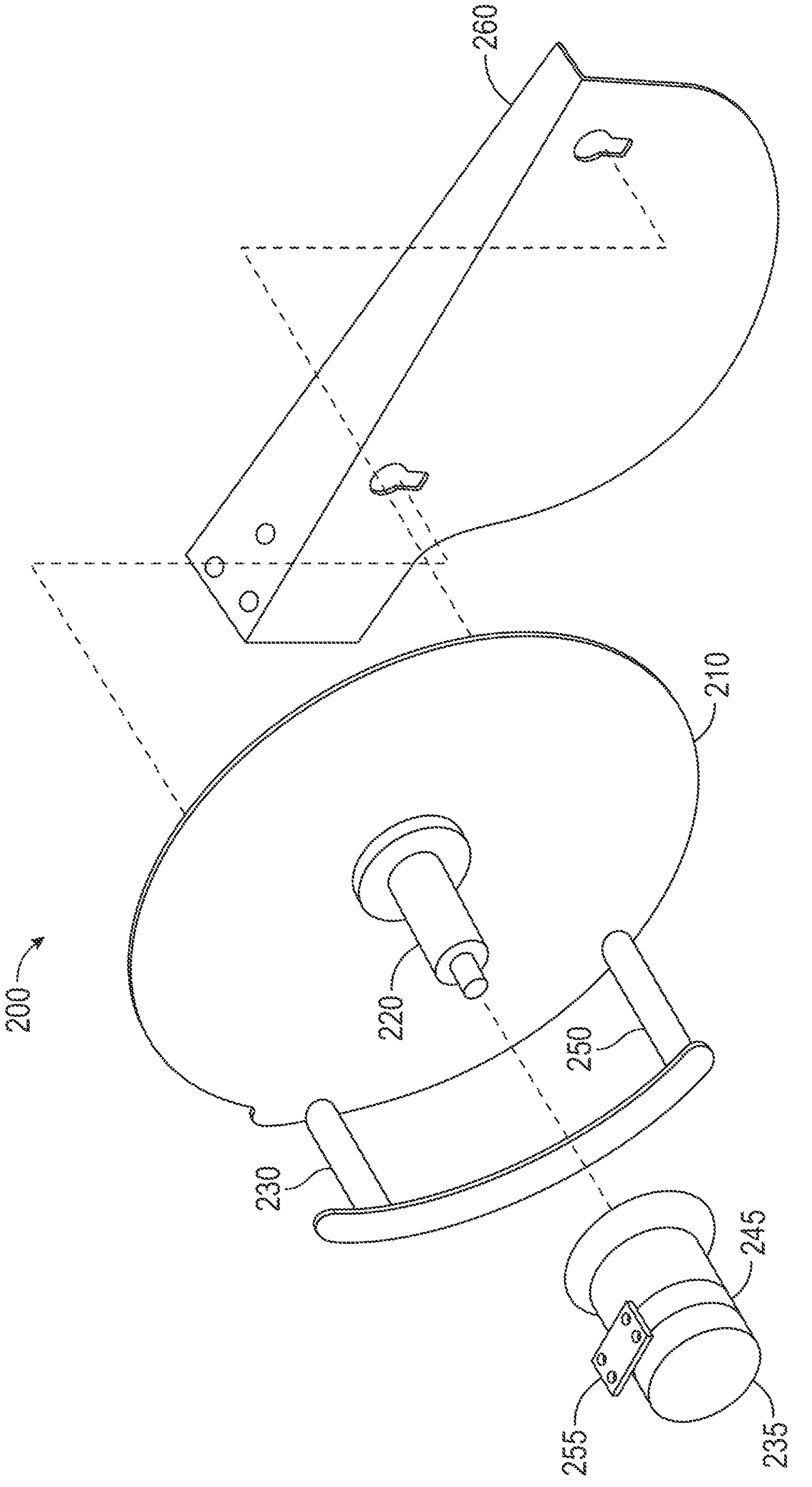
FIG. 2 is an exploded perspective view of a fastener system magazine, according to one embodiment of the present disclosure.

FIG. 2 is an exploded perspective view of an example fastener system magazine 200. The magazine 200 can be configured for use with a fastener system that can insert fasteners to secure two items together or otherwise attach one item to another item. The magazine 200 may include a plate 210, a first guide bar 230, a second guide bar 250, and a post 220. The post 220 may be attached to and orthogonal to the plate 210. In some embodiments, the post 220 is the same height as the first guide bar 230 and the second guide bar 250. In other embodiments, the post 220 is taller than one or more of the first guide bar 230 and the second guide bar 250 such that the post 220 extends from the plate 210 farther than one or more of the first guide bar 230 and the second guide bar 250. In some embodiments, the post 220 can be shorter than one or more of the first guide bar 230 and the second guide bar 250 such that one or more of the first guide bar 230 and the second guide bar 250 extends from the plate 210 farther than the post 220.

The post 220 may be configured to receive and rotatably support a spool 235. The spool 235 may include a strap 245 and a clip 255. The strap 245 may be coupled to the spool 235 at a first end and attached to the clip at a second end. The clip 255 may be configured to be coupled to a fastener strip. The spool 235 and/or strap 245 may be configured to resist movement of the strap 245 as the fastener strip uncoils, thereby maintaining tension in the fastener strip. For example, the spool 235 may be configured to resist rotation of the spool thereby creating resistance of movement of the strap 245. In another example, the strap 245 may be configured to resist unwinding from the spool 235.

The magazine 200 may be configured to be mounted on a mounting plate 260 or other mounting point of a fastener system. The mounting plate 260 may be coupled to or part of a frame of the fastener system. In some embodiments, the mounting plate 260 may include one or more openings for receiving one or more elements of the plate 210 of the magazine 200. For example, the plate 210 may include one or more hooks configured to be couple to the one or more openings in the mounting plate 260. In another example, the plate 210 may include one or more protrusions configured to fit within the one or more openings in the mounting plate 260. In other embodiments, the mounting plate 260 may include one or more hooks or attachment sites for mounting the plate 210 on the mounting plate 260. The plate 210 may include attachment sites configured to interact with the attachment sites of the mounting plate 260.

Figure 3:
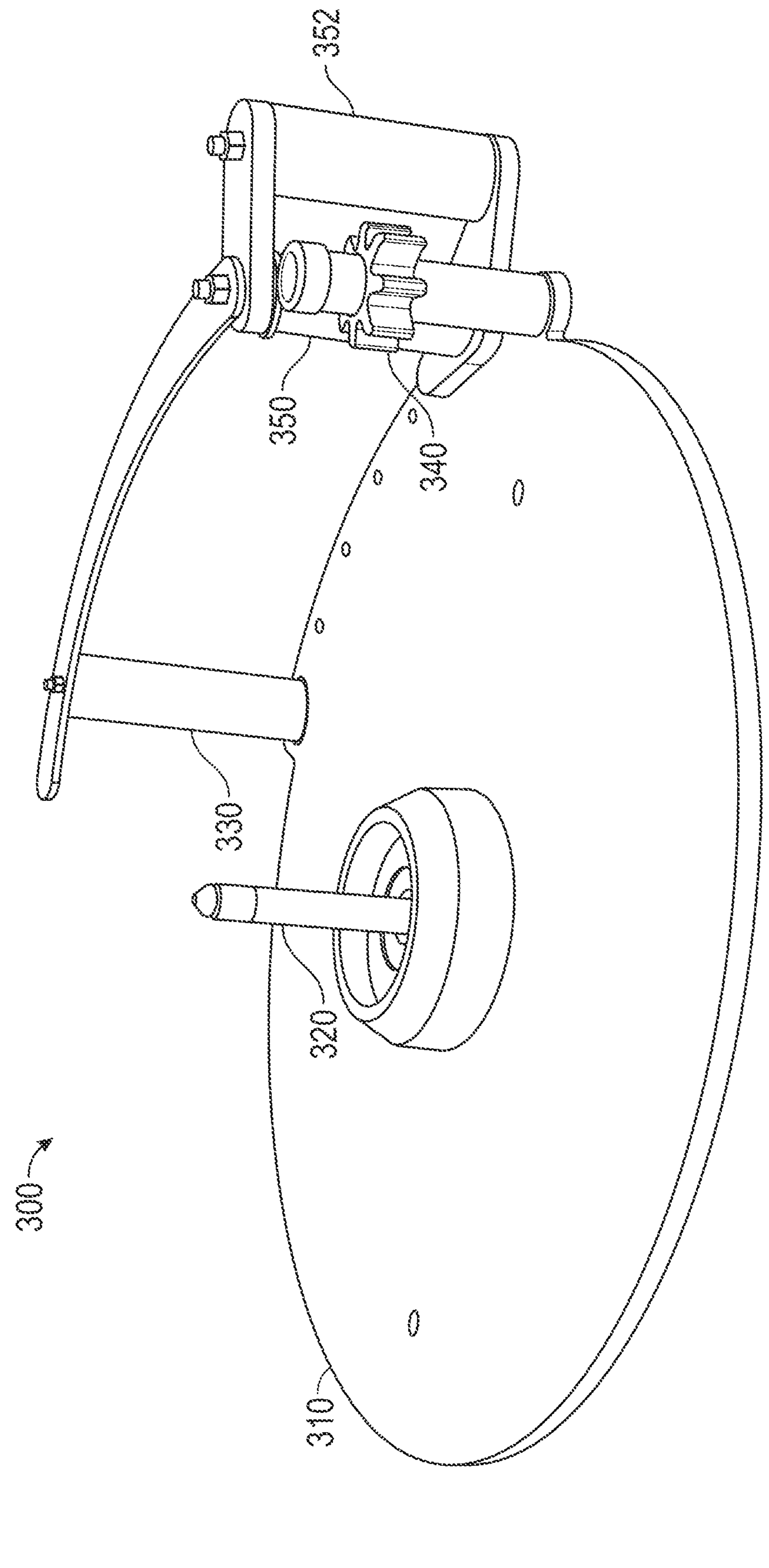
FIG. 3 is a perspective view of a fastener system magazine, according to one embodiment of the present disclosure.

FIG. 3 is a perspective view of an example fastener system magazine 300. The magazine 300 can be configured for use with a fastener system. The magazine 300 may include a plate 310, a post 320, a first guide bar 330, a second guide bar 350, and a tensioner device 340.

The second guide bar 350 may include an extension 352 that guides a fastener strip as the fastener strip uncoils from a coiled configuration. The extension 352 may serve to position the fastener strip farther away from the post 320 before the fastener strip is directed toward the first guide bar 330. In some embodiments, the extension 352 includes a roller that rolls as the fastener strip uncoils. The roller may resist movement of the fastener strip as the fastener strip uncoils.

The tensioner device 340 may be configured to maintain tension in the fastener strip as the fastener strip uncoils from the coiled configuration. In some embodiments, the tensioner device 340 may be located adjacent the first guide bar 330. In other embodiments, the tensioner device 340 may be located adjacent the second guide bar 350. The tensioner device 340 may be configured to prevent the fastener strip from falling off the second guide bar 350 or otherwise losing contact with the second guide bar 350 as the fastener strip uncoils. The tensioner device 340 may be configured to limit movement of the fastener strip as the fastener strip uncoils.

In some embodiments, the tensioner device 340 is a cog that rotates as the fastener strip uncoils. The cog may resist rotation and may resist movement of the fastener strip. Teeth of the cog may be sized based on a size of fasteners of the fastener strip. For example, the teeth of the cog may be sized to receive screws of a particular size (e.g., a thread diameter) having a particular circumference to resist movement of the fastener strip containing screws of the particular size having the particular circumference. In some embodiments, the cog may uniformly resist rotation. In other embodiments, the cog may include a ratchet or other device for resisting rotation only in one direction. The cog may resist rotation only in a direction corresponding to movement of the fastener strip as the fastener strip uncoils. The ratchet or other device for resisting rotation only in one direction may resist rotation in increments corresponding to the spacing of fasteners in the fastener strip. For example, the cog may resist rotation away from a first position where a fastener is held between a first tooth and a second tooth of the cog until the second tooth of the cog is substantially parallel to the fastener strip, at which point the cog ceases to resist rotation until the cog reaches a second position where a next fastener is held between the second tooth of the cog and a third tooth of the cog.

In other embodiments, the tensioner device 340 is a clamp which exerts force on the fastener strip in a direction toward the second guide bar 350. The clamp may increase a force of friction between the fastener strip and the second guide bar 350 by exerting force on the fastener strip in a direction toward the second guide bar 350. The clamp may be positioned such that the clamp resists movement of the fastener strip in a first direction corresponding to the movement of the fastener strip as the fastener strip uncoils and the clamp resists movement of the fastener strip to a greater degree in a second, opposite direction. For example, the clamp may include an arm which is biased towards the second guide bar 350 by a spring. The arm may be positioned such that an end of the arm contacts a fastener in the fastener strip so as to prevent movement of the fastener strip in the second direction. The fastener strip may slide along the arm in the first direction, pushing laterally against the arm until the end of the arm contacts a next fastener. In another example, the clamp may include a piston biased by a spring. The spring may bias the piston towards an extended position. The piston may include a stop which defines a limit to an extension of the piston. The piston may be positioned such that movement of the fastener strip in the first direction is resisted by the spring and movement of the fastener strip in the second direction is prevented by the stop.

In other embodiments, the second guide bar 350 is configured to rotate as the fastener strip uncoils and the tensioner device 340 is a friction disc configured to resist rotation of the second guide bar 350. In some embodiments, the friction disc may be part of or otherwise integrated with the second guide bar 350. For example, the friction disc may be part of the base of the second guide bar 350 where it connects to the plate 310. The friction disc may frictionally engage the plate 310 to resist rotation of the second guide bar 350.

Figure 4:
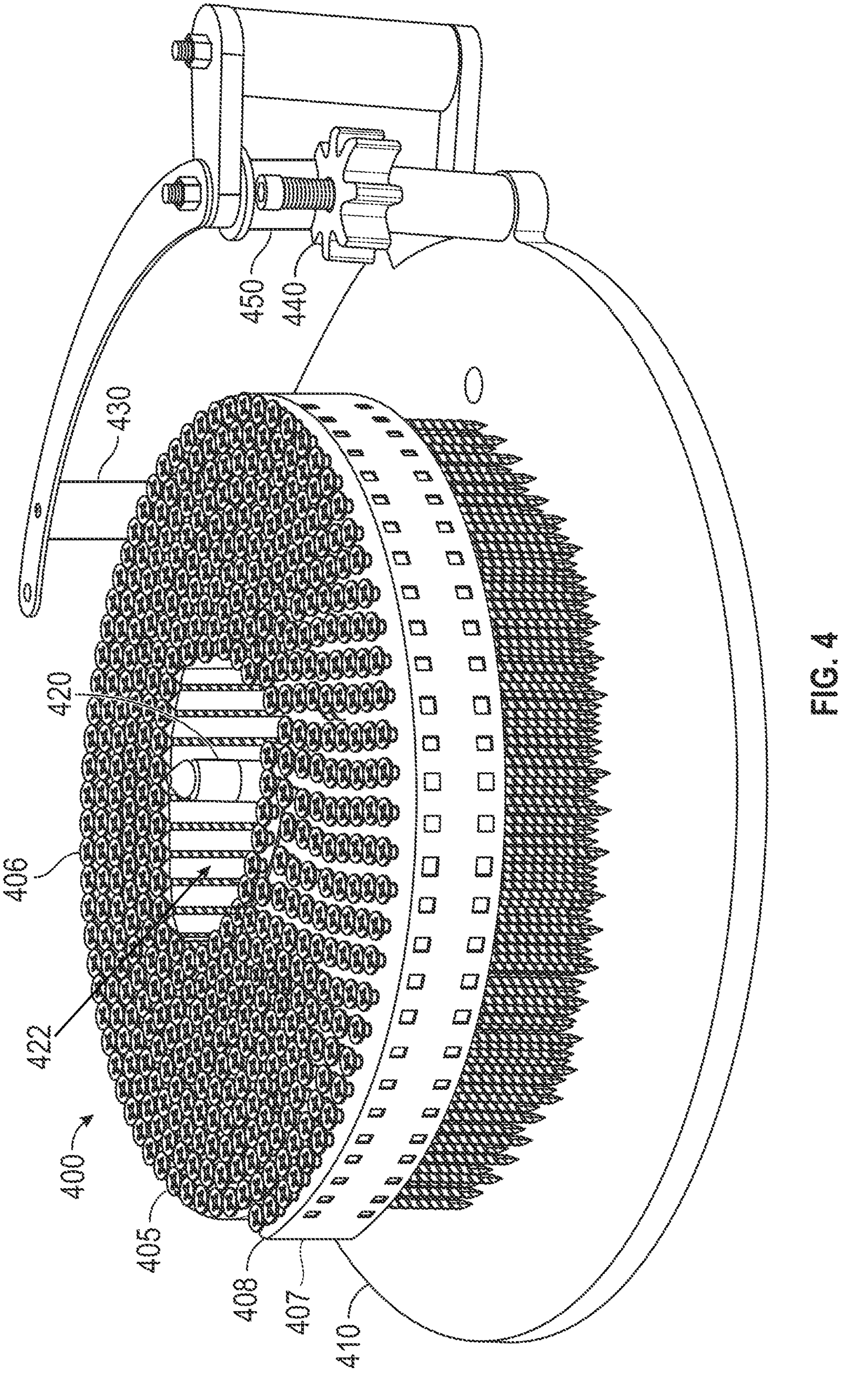
FIG. 4 is a perspective view of a fastener system magazine with a fastener strip, according to one embodiment of the present disclosure.

FIG. 4 is a perspective view of an example fastener system magazine 400 with a fastener strip 405. The magazine 400 can be configured for use with a fastener system. The magazine 400 may include a plate 410, a post 420, a first guide bar 430, a second guide bar 450, and a tensioner device 440. The fastener strip 405 may be in a coiled configuration on the magazine 400 and may uncoil from the coiled configuration. The fastener strip 405 may include fasteners 406 and a backing 407. FIG. 4 illustrates the fastener strip 405 including screws as the fasteners 406, but the fasteners may be nails, staples, adhesive dots, etc. The backing 407 may form a body of the fastener strip 405 and may releasably secure the fasteners 406. The backing 407 may releasably secure each fastener of the fasteners 406 independent of each other fastener of the fasteners. For example, the backing 407 may secure screws independently such that one screw may be released from the backing 107 at a time. The backing 407 may secure the fasteners 406 in an orientation for fastening. For example, the backing 407 may secure screws with their heads facing up and their points facing down such that the screws may be driven into a surface.

The plate 410 may be configured to support the fastener strip 405. The post 420 may be coupled to and orthogonal to the plate 410. The post 420 may be configured to occupy or otherwise be disposed within a void 422 at a center of the fastener strip 405. The fastener strip 405 may uncoil as the fastener strip 405 is fed into a feeder of a fastener system. A leading end 408 of the fastener strip 405 may be directed from the fastener strip 405 to the second guide bar 450. The fastener strip 405 may pass between the second guide bar 450 and the tensioner device 440. The fastener strip 405 may wrap partially around the second guide bar 450 and be directed from the second guide bar 450 to the first guide bar 430. The fastener strip 405 may wrap partially around the first guide bar 430 and be directed from the first guide bar 430 to the feeder of the fastener system.

Figure 5:
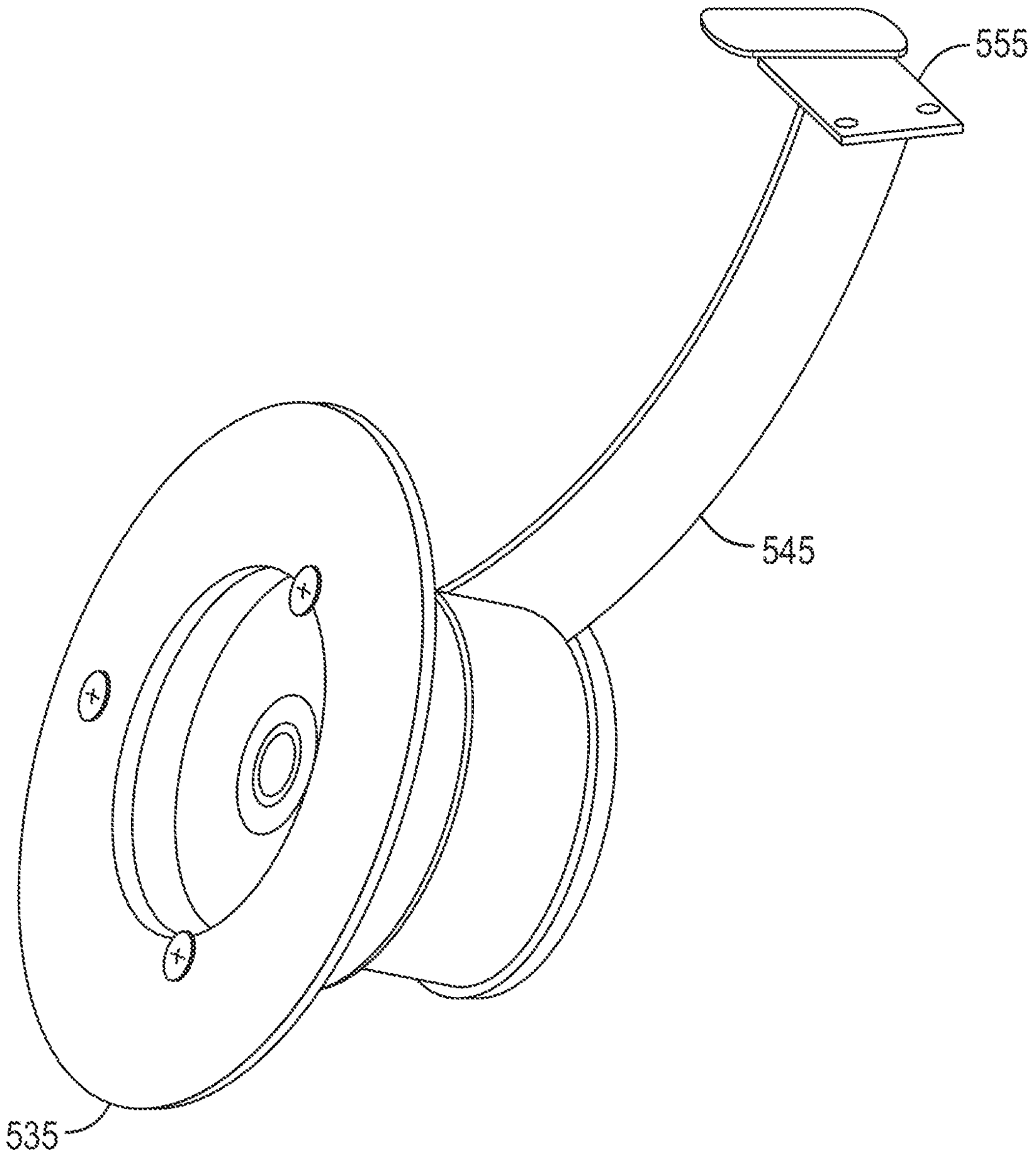
FIG. 5 is a perspective view of a spool of a fastener system magazine, according to one embodiment of the present disclosure.

FIG. 5 is a perspective view of an example spool 535. The spool 535 may include a strap 545 and a clip 555. The strap 545 may be coupled to the spool 535 at a first end and coupled to the clip 555 at a second end. In some embodiments, the first end of the strap 545 may be releasably coupled to the spool 535. In other embodiments, the first end of the strap 545 may be fixably coupled to the spool 535. In yet other embodiments, the first end of the strap 545 may be coupled to the strap 545 such that the strap 545 forms a loop around the spool 535. The strap 545 may be wound about the spool 535. The clip 555 may be coupled to an end of a fastener strip. The strap 545 may be configured to unwind from the spool as the fastener strip uncoils, pulling on the second end of the strap 545. For example, the spool 535 may be configured to rotate with the fastener strip as the fastener strip uncoils. As the uncoiling of the fastener strip nears completion, the strap 545 may be configured to pull against the end of the fastener strip to maintain tension on the end of the fastener strip while gradually unwinding from the spool. Thus, at a point where the fastener strip would fall off of the spool 535 as the fastener strip uncoils and lose tension, the fastener strip is instead biased towards the spool 535 by the strap 545 and tension is maintained in the fastener strip.

In some embodiments, a first side of the strap 545 includes hooks and a second side of the strap 545 includes loops such that the first side of the strap 545 and the second side of the strap 545 are secured together when the strap 545 is wound about the spool 535 and the strap resists being unwound from the spool 535. By resisting being unwound from the spool 535, the strap resists the uncoiling of the fastener strip. By resisting the uncoiling of the fastener strip, the strap 545 may maintain tension in the fastener strip.

The clip 555 may be coupled to the fastener strip without tools. In some embodiments, the clip 555 is a magnetic clip. For example, the clip 555 may include two segments magnetically attracted to one another. The two segments may be attracted to each other through the fastener strip, exerting force on the fastener strip and holding to the fastener strip. In other embodiments, the clip 555 may be a hook and loop clip. For example, the clip 555 may include a first segment including hooks and a second segment including loops. One of the first or second segments may pass through a portion of the fastener strip to contact the other of the first or second segments to hold the fastener strip.

Figure 6:
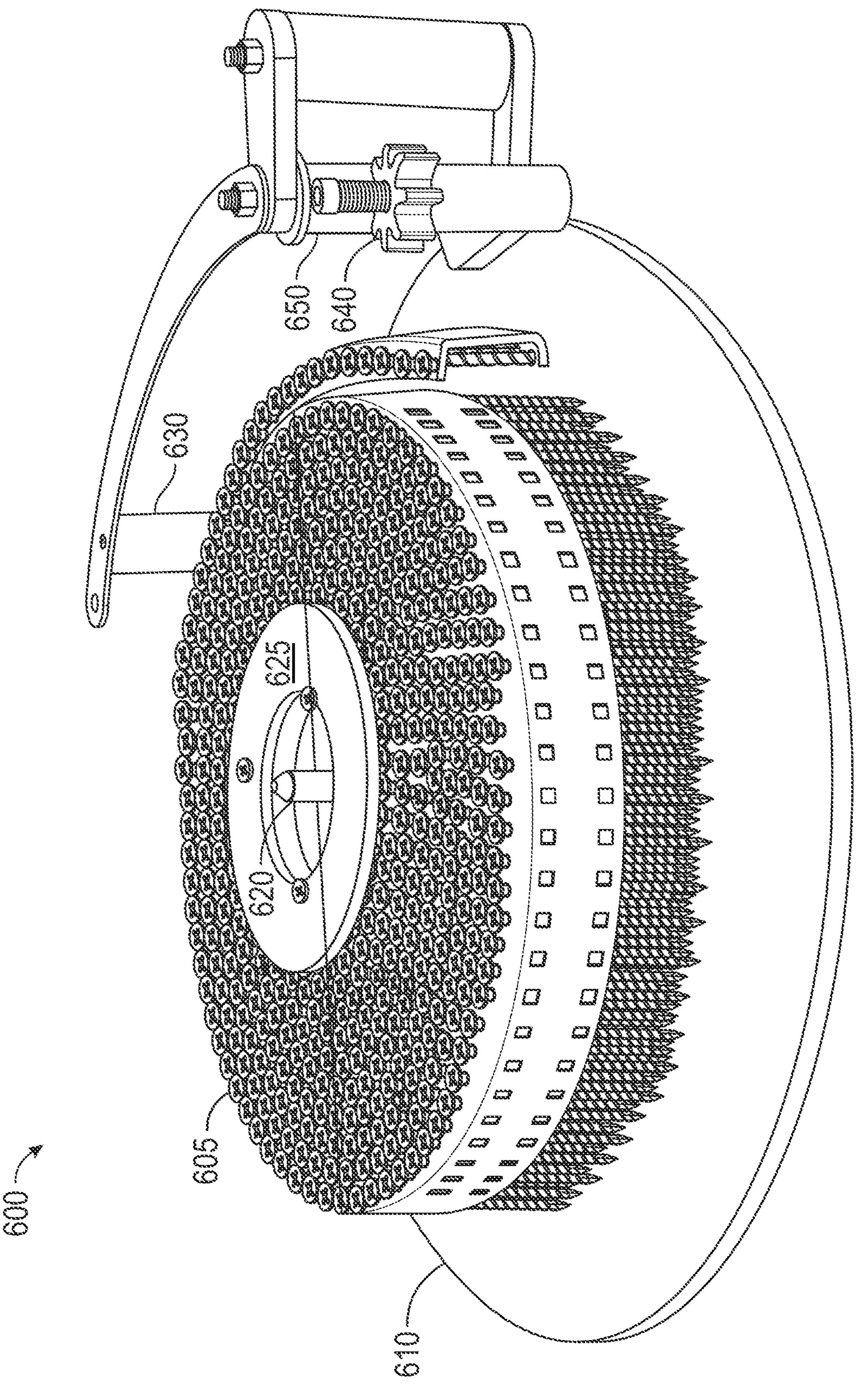
FIG. 6 is a perspective view of a fastener system magazine with a fastener strip and spool, according to one embodiment of the present disclosure.

FIG. 6 is a perspective view of an example fastener system magazine 600 with a fastener strip 605 and a spool 625. The spool 625 may be configured to rotatably support the fastener strip 605. The fastener strip 605 may be supported by a plate 610 of the magazine 600. The fastener strip 605 may include an attachment end and a feeder end. The attachment end may be coupled to a clip of the spool 625. The clip may be coupled to a strap of the spool 625, the strap being wound about the spool 625. The feeder end may be directed to a feeder of the fastener system. The feeder end may be directed by a first guide bar 630 and a second guide bar 650 to the feeder. The feeder end may pass between the second guide bar 650 and a tensioner device 640 of the magazine 600. The feeder end may be directed from the second guide bar 650 to the first guide bar 630. The feeder end may be directed from the first guide bar 630 to the feeder.

The first guide bar 630 and the second guide bar 650 may be positioned to guide the feeder end to maintain tension in the fastener strip 605. The tensioner device 640 may resist movement of the feeder end to maintain tension in the fastener strip 605. The spool 625 may be configured to resist movement of the attachment end to maintain tension in the fastener strip 605. In some embodiments, the spool 625 resists rotation on a post 620 of the magazine 600 to resist movement of the attachment end. In other embodiments, the strap resists unwinding from the spool 625 to resist movement of the attachment end. In yet other embodiments, the post 620 rotates relative to the plate 610 and resists rotation relative to the plate 610 to resist movement of the attached end. Maintaining tension in the fastener strip 605 has the advantage of avoiding slippage of the fastener strip 605. Maintaining tension in the fastener strip 605 has the advantage of providing for uniform movement of the feeder end to the feeder. Maintaining tension in the fastener strip 605 using the strap allows the fastener strip 605 to maintain tension for more of the length of the fastener strip 605, allowing for use of more of the length of the fastener strip 605, than possible without using the strap. The strap can maintain tension of the fastener strip 605 until the end (the attachment end) of the fastener strip 605 successfully reaches the feeder. Maintaining tension in the fastener strip 605 using the strap prevents the attachment end from coming loose of the magazine 600, which can potentially jam the feeder and/or pulling the feeder end away from the feeder. Slack in the fastener strip 605 as it is fed into the feeder can lead to jamming of the feeder and/or misfiring of the fastener system.

Figure 7:
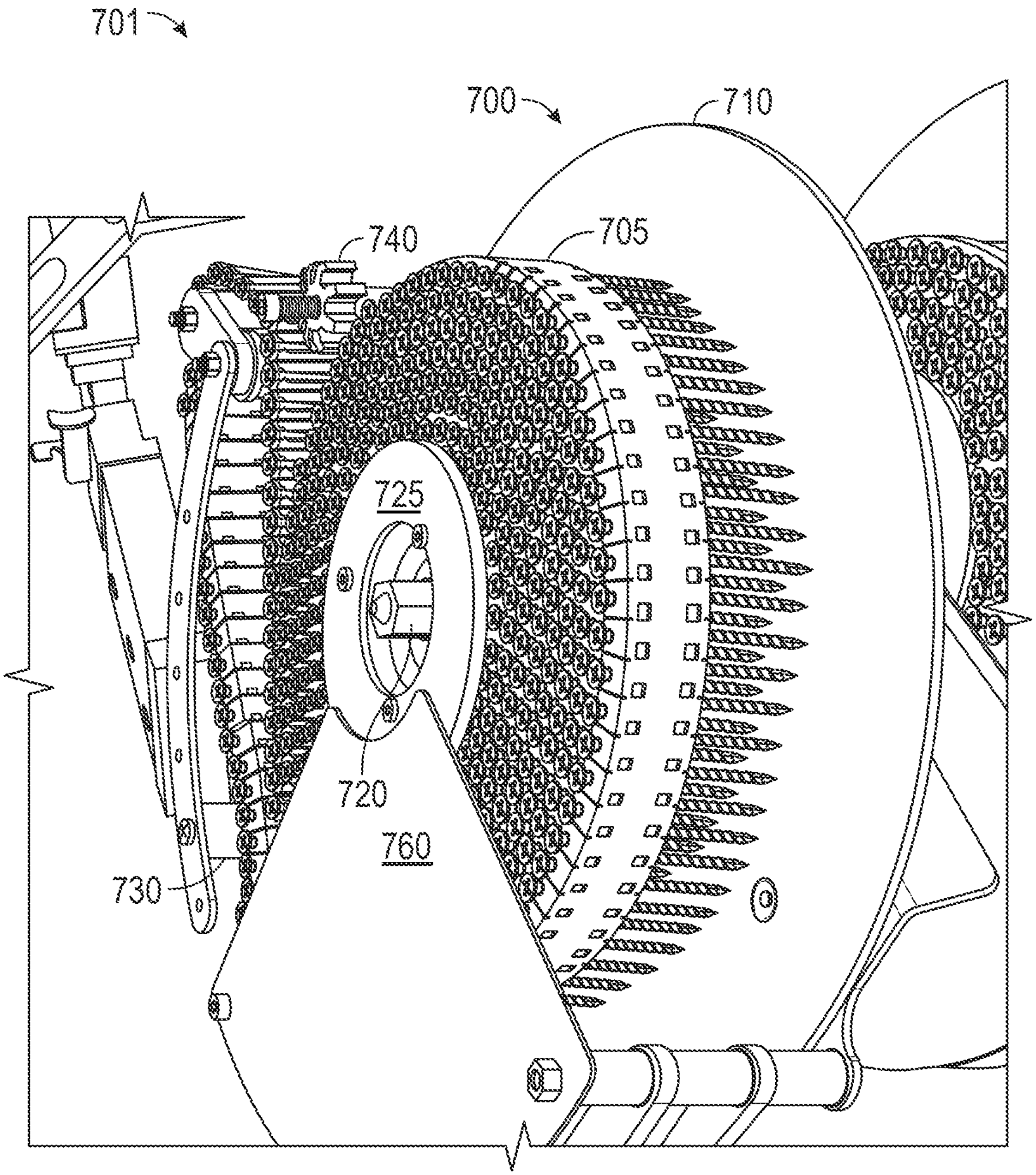
FIG. 7 is a perspective view of a fastener system magazine mounted on a frame of a fastener system, according to one embodiment of the present disclosure.

FIG. 7 is a perspective view of an example fastener system magazine 700 mounted on a frame 760 of an example fastener system 701. The magazine 700 may include a plate 710 and a post 720, coupled to and orthogonal to the plate 710. The magazine 700 may include a spool 725 rotatably supported by the post 720. The spool 725 may support a fastener strip 705. The magazine 700 may include a first guide bar 730, a second guide bar, and a tensioner device 740. The first guide bar 730 may direct a feeder end of the fastener strip 705 to a feeder of the fastener system 701. The feeder may be movable relative to the frame 760. The feeder may feed the feeder end of the fastener strip 705 to a fastener gun.

The magazine 700 may be removably mounted on the frame 760 of the fastener system 701 on a mounting plate of the frame 760. The magazine 700 may be mounted on the frame 760 when the fastener strip 705 is in the magazine 700. The magazine 700, with the fastener strip 705, may be mounted on the frame 760 and the feeder end of the fastener strip 705 directed over the second guide bar, over the first guide bar 730, and to the feeder. When the fastener strip 705 has been used up, the magazine 700 may be removed from the frame 760. The magazine 700, when empty, may be filled with a new fastener strip 705. The magazine 700, when empty, may be replaced with another magazine 700 filled with a fastener strip 705.

A method for providing the fastener strip 705 to the feeder may include removing the fastener strip magazine 700 from the frame 760. The magazine 700 may be mounted on the frame 760 such that it may be removed without tools. In some embodiments, the magazine 700 may be removed by moving the magazine in a particular direction or series of directions. For example, the magazine 700 may be removed from the frame 760 by lifting the magazine 700 upwards and then outwards away from the frame 760.

The method may include loading the fastener strip 705 in the magazine 700 remote from the frame 760 and otherwise remote from the fastener system 701. An empty fastener strip (the fasteners have been applied, discharged or otherwise removed from a backing or other support material of the fastener strip) may be removed from the magazine 700 by opening a clip (e.g., see clip 555 of FIG. 5) coupled to a strap coupled to the spool 725 of the magazine 700. A fastener strip 705 may be placed on the plate 710 about the spool and coupled at an attachment end to the clip. A feeder end of the fastener strip 705 may be fed between the second guide bar and the tensioner device 740, around the second guide bar toward the first guide bar 730, and around the first guide bar. The magazine 700 may be mounted on the frame 760 such that the fastener strip 705 feeds into the feeder. The feeder end may be fed from the first guide bar 730 to the feeder. In some embodiments, the magazine 700 may be mounted on the frame 760 such that the magazine 700 is tilted. Tilting the magazine 700 so that the magazine 700 is not perfectly vertical may prevent the fastener strip 705 from falling off of the magazine 700. The magazine 700 may be tilted such that a plane defined by the plate 710 of the magazine 700 is no more than 30° from vertical and no less than 10° from vertical. The tilt of the magazine 700 may depend upon a stiffness, weight, and size of the fastener strip 705.

Figure 8:
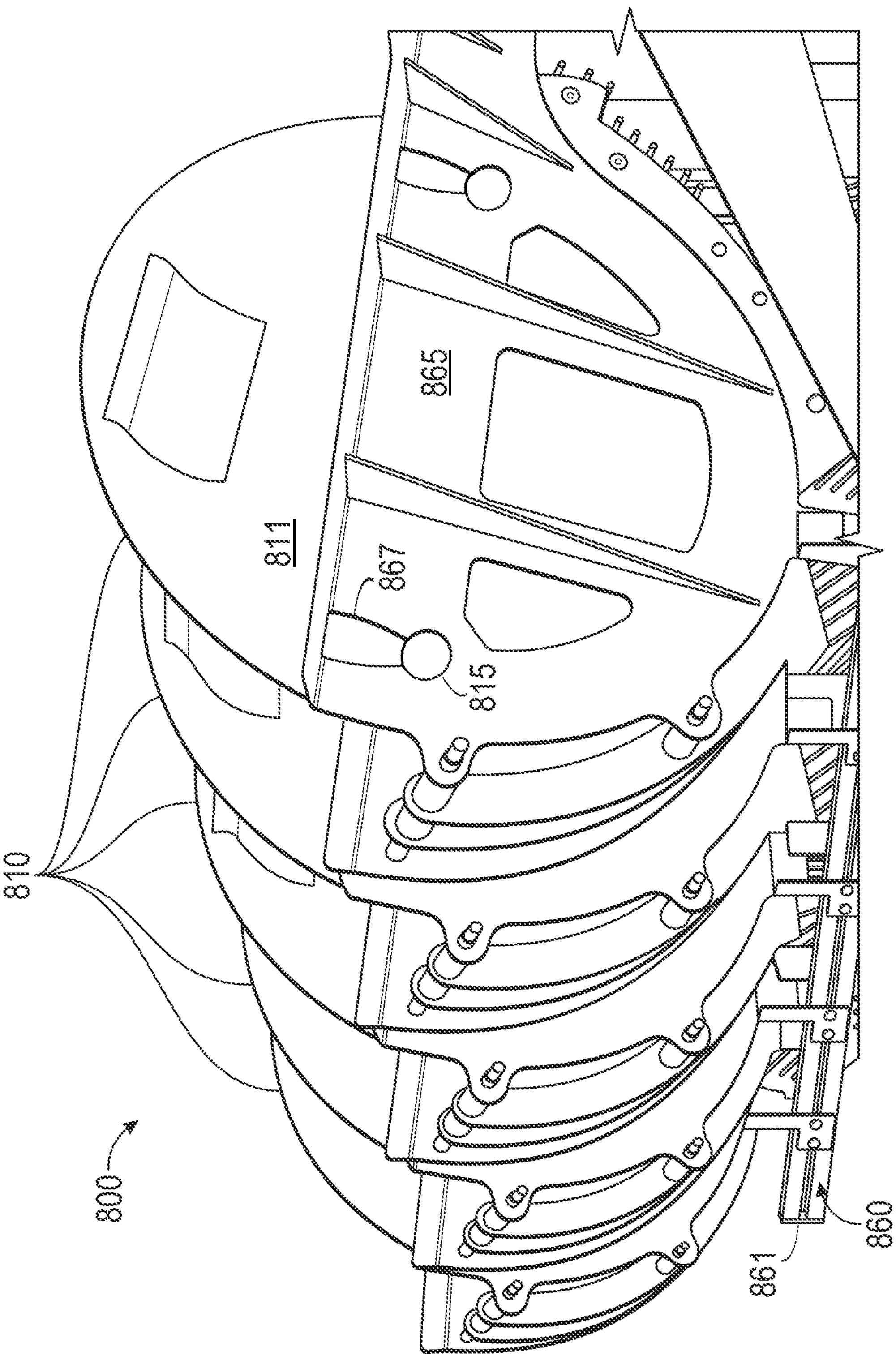
FIG. 8 is a perspective view of multiple fastener system magazines mounted on a frame of a fastener system, according to one embodiment of the present disclosure.

FIG. 8 is a perspective view of multiple example fastener system magazines 810 mounted on a frame 860 of an example fastener system. The frame 860 may include a mounting plate 865 for mounting each of the multiple fastener system magazines 810 (e.g., multiple mounting plates 865 each one for mounting a fastener system magazine 810). The frame 860 may include a horizontal beam 861 on which the mounting plate 865 of each of the fastener system magazines 810 is mounted. The mounting plate 865 may be configured to receive a plate 811 of a fastener system magazine 810.

The fastener system magazine 810 may be coupled to the frame 860 by a mount securement mechanism. The mount securement mechanism may allow the fastener system magazine 810 to be removably mounted to the frame 860. As an example of the mount securement mechanism, the mounting plate 865 may include one or more openings 867. The one or more openings 867 may be configured to receive one or more protrusions 815 on the plate 811 of the fastener system magazine 810. The one or more openings 867 may be shaped such that the one or more protrusions 815 may pass through the one or more openings 867 at a first end of the one or more openings 867 but not at a second end of the one or more openings 867. The one or more protrusions 815 may each be wider at a distal end than along a length of each protrusion. For example, the one or more protrusions 815 may be cylindrical posts having a first circumference with circular caps having a second, larger circumference. The caps may be able to pass through the one or more openings 867 at the first end of the one or more openings 867 but not the second end of the one or more openings 867. The one or more protrusions 815 may be prevented from moving away from the mounting plate 865 when the one or more protrusions are located at the second end of the one or more openings 867, holding the magazine in place on the mounting plate 865. The magazine may be removed from the mounting plate 865 by lifting the magazine up such that the one or more protrusions 815 reach the first end of the one or more openings 867 and then moving the magazine away from the mounting plate 865.

The magazines 810 may be mounted on the frame 860 side by side. The magazines 810 may be mounted on the frame 860 horizontally such that posts on the plates of the magazines point up. The magazines 810 may be mounted on the frame 860 vertically such that the posts on the plates of the magazines point sideways. The magazines 810 may be mounted on the frame 860 at an angle between horizontal and vertical. The magazines 810 may be tilted so that fastener strips do not fall out of the magazines 810 and so that the magazines 810 fit on the frame 860 and allow relatively small distance(s) between adjacent feeders or between adjacent guns.

Figure 9:
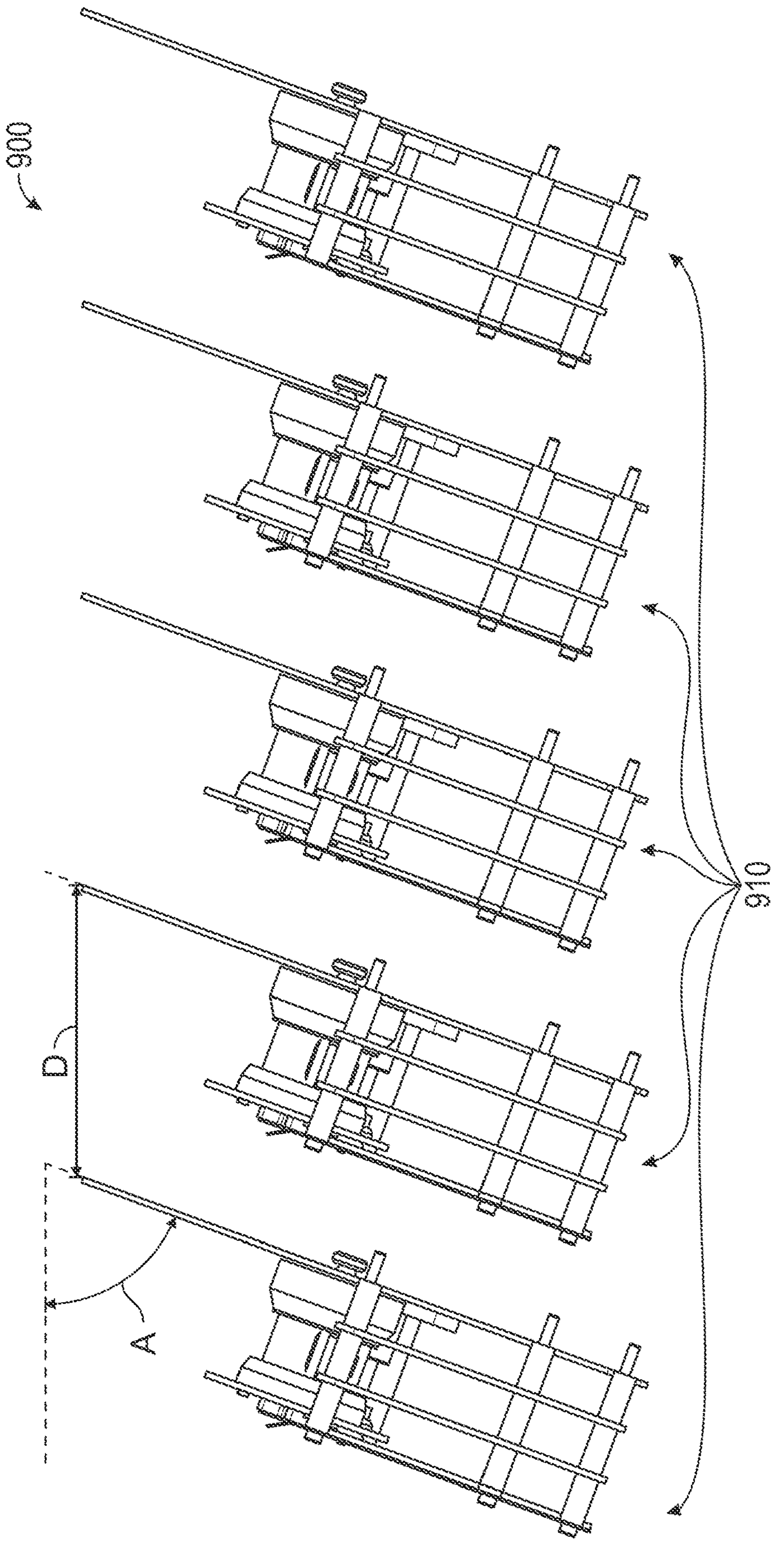
FIG. 9 illustrates an arrangement of multiple fastener system magazines, according to one embodiment of the present disclosure.

FIG. 9 illustrates an example arrangement 900 of multiple example fastener system magazines 910. The magazines 910 may be mounted on a frame of a fastener system. The magazines may be tilted at an angle A so that fastener strips do not slip or fall out of the magazines 910. The angle may be determined based on several factors including, but not limited to: how many magazines 910 need to fit on the frame, the size of the frame, a stiffness of the fastener strips, and an amount of space required to remove the magazines from mounting plates of the frame. A space or distance D between the magazines 910 may be determined based on the angle of the magazines 910 as well as the amount of space required to remove the magazines from the mounting plates of the frame. For example, the magazines 910 may be tilted at an angle 45° relative to horizontal and a distance between upper distal ends of the magazines 910 may be 7 inches. In another example, the magazines 910 may be tilted at an angle 70° relative to horizontal and a distance between upper distal ends of the magazines 910 may be 6 inches. In yet another example, the magazines 910 may be tilted at an angle 80° relative to horizontal and a distance between upper distal ends of the magazines 910 may be 4.5 inches. In yet another example, the magazines 910 may be mounted at an angle 90° relative to horizontal and a distance between upper distal ends of the magazines 910 may be 4.5 inches. In yet another example, the magazines 910 may be mounted horizontal and a distance between the magazines may be 15 inches. In some embodiments, the magazines 910 may be mounted at any angle relative to horizontal.

The arrangement 900 of tilted magazines 910 may allow for more magazines 910 to be mounted on the frame than if the magazines 910 were not tilted. The arrangement 900 of tilted magazines 910 may allow for more fastener guns to be fed by magazines 910, leading to increased scalability. In some embodiments, the magazines 910 may be evenly spaced. In other embodiments, the magazines 910 may be spaced at various intervals.

Figure 10A:
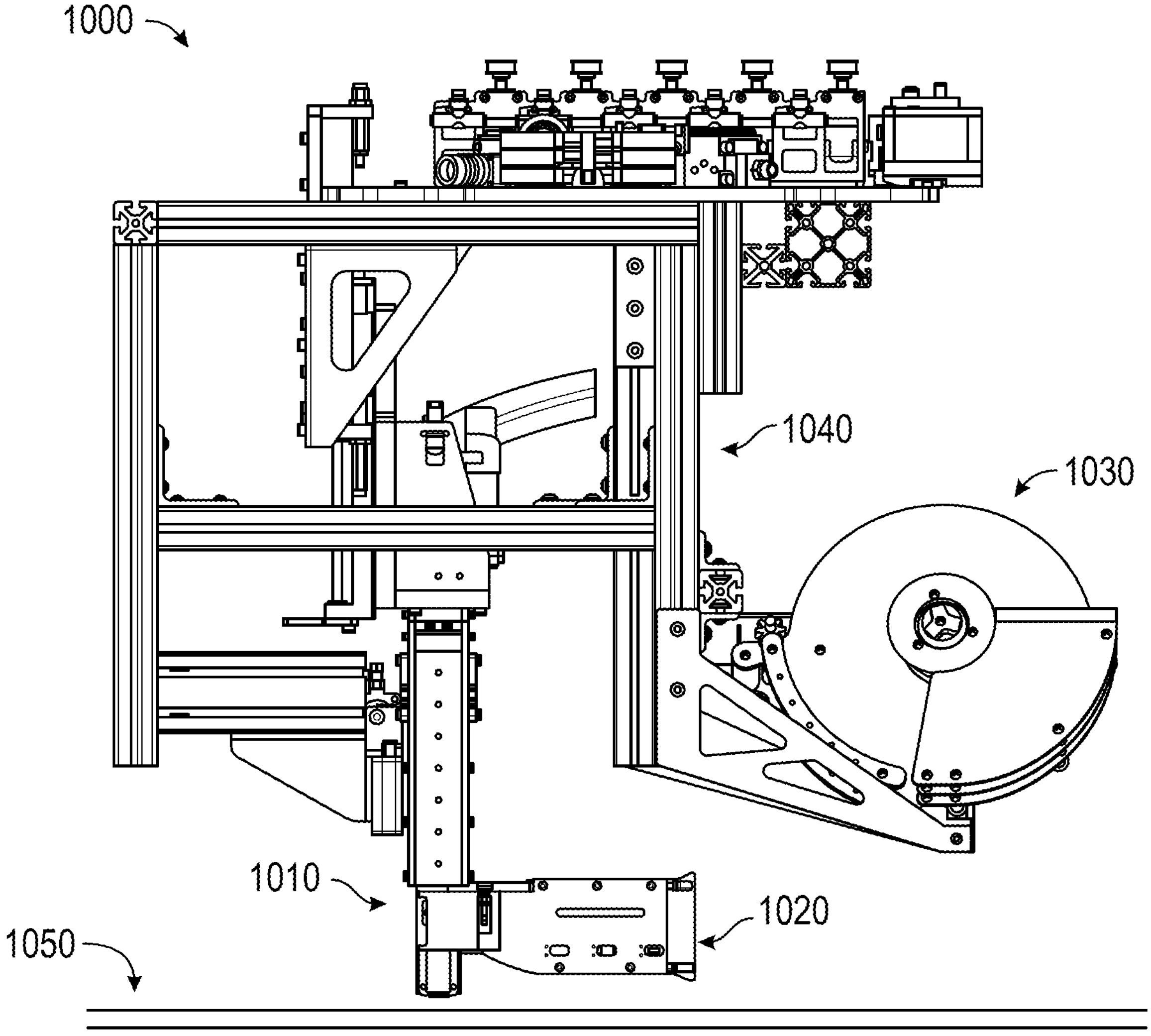
FIG. 10A is a side view of a fastener system, according to one embodiment of the present disclosure.

FIG. 10A is a side view of a fastener system 1000, according to one embodiment of the present disclosure. The fastener system 1000 may be the fastener system 701 of FIG. 7. The fastener system may include a fastener gun 1010, a feeder 1020, a magazine 1030, and a frame 1040. The fastener gun 1010 may be slidably attached to the frame 1040 such that the fastener gun 1010 is movable relative to the frame 1040. The fastener gun 1010 may be configured to drive fasteners of a fastener strip into a surface 1050. For example, the fastener gun 1010 may receive a strip of screws and drive screws from the strip of screws into the surface 1050. The feeder 1020 may be configured to receive a fastener strip (not shown) from the magazine 1030 and feed the fastener strip to the fastener gun 1010.

Figure 10B:
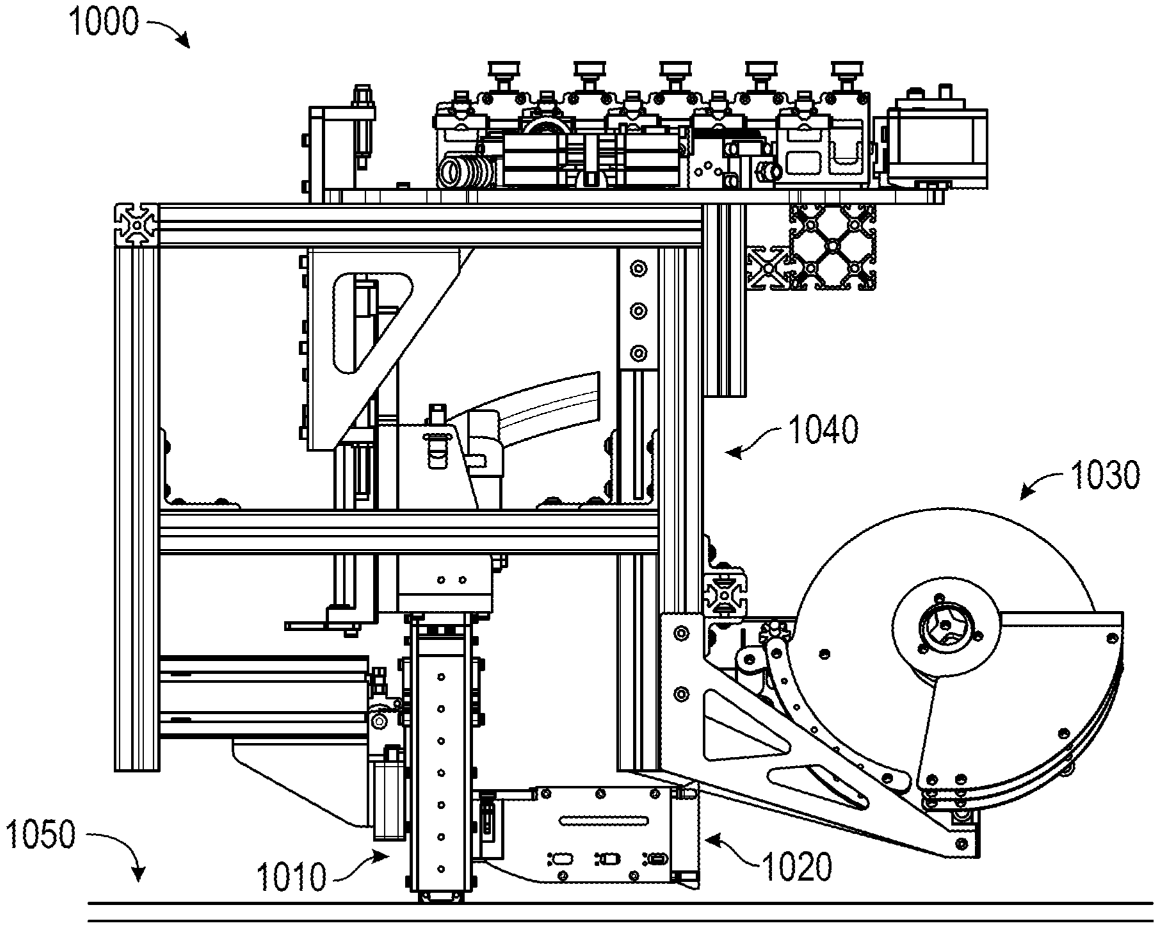
FIG. 10B is a side view of the fastener system of FIG. 10A driving a fastener into a surface, according to one embodiment of the present disclosure.

FIG. 10B is a side view of the fastener system 1000 of FIG. 10A driving a fastener into the surface 1050, according to one embodiment of the present disclosure. The fastener gun 1010 may be slidably attached to the frame 1040 such that the fastener gun 1010 is movable relative to the frame 1040. For example, the fastener gun 1010 and the frame 1040 may move downwards until the fastener gun 1010 contacts the surface 1050. The frame 1040 may continue to move downwards as the fastener gun 1010 rests against the surface 1050 and the fastener gun 1010 drives the fastener into the surface 1050. The fastener gun 1010 may be configured to drive fasteners of a fastener strip into a surface 1050. For example, the fastener gun 1010 may receive a strip of screws and drive screws from the strip of screws into the surface 1050. The feeder 1020 may be configured to receive a fastener strip (not shown) from the magazine 1030 and feed the fastener strip to the fastener gun 1010.

In an example, a robot fastener system includes a frame and multiple screw guns movable relative to the frame. The frame includes a horizontal beam to which are attached multiple mounting plates. The mounting plates are configured to receive magazines. The mounting plates are attached side by side on the horizontal beam at an angle. The angle is 70° relative to horizontal to prevent screw strips from falling out of the magazines while maximizing the number of magazines that can be mounted on the frame. The mounting plates are evenly spaced on the horizontal beam at a distance of 6 inches, as measured between distal ends of adjacent mounting plates. The mounting plates are sized slightly larger than plates of the magazines. Each magazine includes a post attached to and orthogonal to a plate of the magazine. The post is configured to rotatably support a spool which is configured to rotatably support a screw strip. The spool includes a strap wound about the spool and a clip attached to a distal end of the strap. The clip attaches to an attachment end of the screw strip to maintain tension in the screw strip as the screw strip uncoils. A feeder end of the screw strip is fed between a tensioner guide bar and a tensioner device. The tensioner device is a cog which resists rotation and which is located adjacent the tensioner guide bar such that it resists movement of the screw strip as the screw strip uncoils and holds the screw strip against the tensioner guide bar. The tensioner guide bar is positioned such that the screw strip is directed in a first direction as it uncoils. The screw strip partially wraps around the tensioner guide bar and is directed in a second direction substantially opposite the first direction to a guide bar. The screw strip partially wraps around the guide bar and is directed in a third direction to a feeder. As the feeder draws the screw strip towards itself, the screw strip uncoils. When the screw strip is nearly finished, the strap is drawn between the tensioner guide bar and the cog and then towards the guide bar. The strap allows for substantially all of the screws in the screw strip to be used. When the screw strip is empty or substantially empty, the clip is detached from the screw strip and the magazine is removed from the mounting plate. The magazine is taken to a location remote from the frame and a second screw strip is placed on the spool. The clip is attached to an attachment end of the second screw strip and a feeder end of the second screw strip is fed between the tensioner guide bar and the tensioner device, around the tensioner guide bar and towards the guide bar. The magazine, reloaded with the second screw strip, is taken back to the frame and mounted on the mounting plate. The feeder end of the second screw strip is fed into a feeder of the screw gun.

EXAMPLES

Some examples of embodiments of the present disclosure are as follows:

Example 1. A fastener strip magazine comprising: a plate; a post attached to and perpendicular to the plate, wherein the post is configured to rotatably support a spool configured to support a fastener strip, the spool comprising: a strap configured to wind about the spool; and a clip attached to the strap and configured to attach to a first end of the fastener strip; and a guide bar attached to the plate and configured to direct a second end of the fastener strip to a feeder as the fastener strip uncoils.

Example 2. The magazine of example 1, wherein the guide bar is positioned to maintain tension in the fastener strip as the fastener strip uncoils.

Example 3. The magazine of example 1, further comprising a second guide bar attached to the plate and configured to direct the second end of the fastener strip in a first direction away from the feeder and towards the guide bar.

Example 4. The magazine of example 3, wherein the guide bar and the second guide bar are positioned to maintain tension in the fastener strip as the fastener strip uncoils.

Example 5. The magazine of example 1, further comprising a cog attached to the plate adjacent the guide bar such that the second end of the fastener strip passes between the cog and the guide bar as the fastener strip uncoils.

Example 6. The magazine of example 1, wherein the plate is configured to be removably mounted to a frame of a fastener gun comprising the feeder.

Example 7. The magazine of example 6, wherein the feeder is movable relative to the frame of the fastener gun.

Example 8. The magazine of example 6, wherein the magazine is configured to receive the fastener strip when not mounted adjacent the feeder.

Example 9. The magazine of example 1, wherein the clip comprises a magnetic clip.

Example 10. The magazine of example 1, wherein a first end of the strap is attached to the spool and the clip is attached to the strap at a second end of the strap.

Example 11. The magazine of example 1, wherein a first side of the strap comprises hooks and a second side of the strap comprises loops such that the first side of the strap and the second side of the strap are secured together when the strap is wound about the spool and the strap resists the uncoiling of the fastener strip.

Example 12. A fastener strip magazine comprising: a plate; a post attached to and perpendicular to the plate, wherein the post is configured to receive a fastener strip; a guide bar attached to the plate and configured to direct {{guide}} an end of the fastener strip to a feeder as the fastener strip uncoils; and a tensioner device configured to resist motion of the fastener strip to maintain tension in the fastener strip as the fastener strip uncoils.

Example 13. The magazine of example 13, wherein the tensioner device comprises a cog which rotates as the fastener strip uncoils.

Example 14. The magazine of example 12, wherein the tensioner device comprises a clamp which exerts force on the fastener strip toward the guide bar.

Example 15. The magazine of example 12, wherein the tensioner device comprises a spring Example 16. The magazine of example 12, wherein the guide bar is configured to rotate as the fastener strip uncoils, and wherein the tensioner device comprises a friction disc configured to resist rotation of the guide bar.

Example 17. The magazine of example 12, further comprising a second guide bar attached to the plate and configured to direct the second end of the fastener strip in a first direction away from the feeder and towards the guide bar.

Example 18. The magazine of example 17, wherein the guide bar and the second guide bar are positioned to maintain tension in the fastener strip as the fastener strip uncoils.

Example 19. The magazine of example 12, wherein the post is configured to rotatably support a spool configured to support a fastener strip, the spool comprising: a strap configured to wind about the spool; and a clip attached to the strap and configured to attach to a first end of the fastener strip.

Example 20. The magazine of example 19, wherein a first end of the strap is attached to the spool and the clip is attached to the strap at a second end of the strap.

Example 21. The magazine of example 12, wherein the plate is configured to be removably mounted to a frame of a fastener gun comprising the feeder.

Example 22. The magazine of example 17, wherein the feeder is movable relative to the frame of the fastener gun.

Example 23. The magazine of example 17, wherein the magazine is configured to receive the fastener strip when not mounted adjacent the feeder.

Example 24. The magazine of example 12, wherein a first side of the strap comprises hooks and a second side of the strap comprises loops such that the first side of the strap and the second side of the strap are secured together when the strap is wound about the spool and the strap resists the uncoiling of the fastener strip.

Example 25. A method comprising: removing a fastener strip magazine from a frame of a robot fastener; loading a fastener strip in the fastener strip magazine remote from the frame of the robot fastener; and mounting the fastener strip magazine on the frame of the robot fastener such that the fastener strip feeds into the robot fastener.

Example 26. The method of example 25, wherein loading the fastener strip in the fastener strip magazine comprises loading the fastener strip on a spool rotatably supported on a post of the fastener strip magazine.

Example 27. The method of example 26, further comprising attaching an attachment end of the fastener strip to a strap configured to wind about the spool.

Example 28. The method of example 27, wherein attaching the attachment end of the fastener strip to the strap comprises attaching the attachment end of the fastener strip to a magnetic clip attached to the strap.

Example 29. The method of example 27, wherein attaching the attachment end of the fastener strip to the strap comprises attaching the attachment end of the fastener strip to a hook and loop clip attached to the strap.

Example 30. The method of example 25, wherein loading the fastener strip magazine in the fastener strip magazine comprises disposing a feeder end of the fastener strip adjacent a guide bar of the magazine configured to maintain tension in the fastener strip as the fastener strip feeds into the robot fastener.

Example 31. The method of example 30, wherein disposing the feeder end of the fastener strip adjacent the guide bar of the magazine comprises disposing the feeder end of the fastener strip between the guide bar and a rotatable cog attached to the magazine, the cog configured to regulate movement of the fastener strip as the fastener strip feeds into the robot fastener.

Example 32. The method of example 25, wherein loading the fastener strip magazine in the fastener strip magazine comprises disposing a feeder end of the fastener strip adjacent a first guide bar such that the feeder end is directed away from the robot fastener and disposing the feeder end adjacent a second guide bar such that the feeder end is directed towards the robot fastener, the first and second guide bars configured to maintain tension in the fastener strip as the fastener strip feeds into the robot fastener.

Example 33. The method of example 25, wherein mounting the fastener strip magazine on the frame of the robot fastener comprises mounting the fastener strip such that a plane defined by a plate of the fastener strip magazine is no more than 30° from vertical and no less than 10° from vertical.

Example 34. A fastener gun frame comprising: a plurality of magazines arranged adjacent one another, the plurality of magazines tilted such that parallel planes defined by plates of the magazines are tilted between 45° to 85° relative to a horizontal axis, wherein each respective magazine of the plurality of magazines feeds a fastener strip to a respective fastener gun, wherein the respective fastener gun is moveable relative to the plurality of magazines.

Example 35. The fastener gun frame of example 34, wherein the plurality of magazines are evenly spaced.

Example 36. The fastener gun frame of example 35, wherein a distance between adjacent magazines of the plurality of magazines is based on a tilt angle of the plurality of magazines.

Example 37. The fastener gun frame of example 36, wherein the tilt angle of the plurality of magazines is based on a stiffness of the fastener strip fed by each respective magazine to the respective fastener gun.

Example 38. The fastener gun frame of example 34, further comprising a horizontal beam to which the plurality of magazines are attached.

Example 39. The fastener gun frame of example 38, further comprising a plurality of mounts on which the plurality of magazines are mounted, the mounts tilted at the same angle as the plurality of magazines.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, these quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

While the principles of this disclosure have been shown in various embodiments, many modifications of structure, arrangements, proportions, elements, materials, and components used in practice and that are particularly adapted for a specific environment and operating requirements may be used without departing from the principles and scope of this disclosure. These and other changes or modifications are intended to be included within the scope of the present disclosure.

The scope of the present invention should, therefore, be determined only by the following claims.

What is claimed is:

1. A fastener strip magazine comprising:

a plate;

a post attached to and perpendicular to the plate, wherein the post is configured to rotatably support a spool configured to support a fastener strip, the spool comprising:

a strap configured to wind about the spool; and a clip attached to the strap and configured to attach to a first end of the fastener strip; and a guide bar attached to the plate and configured to direct a second end of the fastener strip to a feeder as the fastener strip uncoils.

2. The magazine of claim 1, wherein the guide bar is positioned to maintain tension in the fastener strip as the fastener strip uncoils.

3. The magazine of claim 1, further comprising a second guide bar attached to the plate and configured to direct the second end of the fastener strip in a first direction away from the feeder and towards the guide bar.

4. The magazine of claim 3, wherein the guide bar and the second guide bar are positioned to maintain tension in the fastener strip as the fastener strip uncoils.

5. The magazine of claim 1, further comprising a cog attached to the plate adjacent the guide bar such that the second end of the fastener strip passes between the cog and the guide bar as the fastener strip uncoils.

6. The magazine of claim 1, wherein the plate is configured to be removably mounted to a frame of a fastener gun comprising the feeder.

7. The magazine of claim 6, wherein the feeder is movable relative to the frame of the fastener gun.

8. The magazine of claim 1, wherein the clip comprises a magnetic clip.

9. The magazine of claim 1, wherein a first end of the strap is attached to the spool and the clip is attached to the strap at a second end of the strap.

10. The magazine of claim 1, wherein a first side of the strap comprises hooks and a second side of the strap comprises loops such that the first side of the strap and the second side of the strap are secured together when the strap is wound about the spool and the strap resists the uncoiling of the fastener strip.

11. A fastener gun frame comprising:

a plurality of magazines arranged adjacent one another, at least one of the plurality of magazines comprising the fastener strip magazine of claim 1, the plurality of magazines tilted such that parallel planes defined by plates of the magazines are tilted between 45° to 85° relative to a horizontal axis, wherein each respective magazine of the plurality of magazines feeds a fastener strip to a respective fastener gun, and wherein the respective fastener gun is moveable relative to the plurality of magazines.

12. The fastener gun frame of claim 11, wherein a distance between adjacent magazines of the plurality of magazines is based on a tilt angle of the plurality of magazines.

13. The fastener gun frame of claim 12, further comprising a plurality of mounts on which the plurality of magazines are mounted, the mounts tilted at the same angle as the plurality of magazines.

* * * * *